United States Patent
Fraczek (10) Patent No.: US 10,520,120 B2
(45) Date of Patent: Dec. 31, 2019

(54) DRILLING RISER FLANGES AND ASSEMBLIES WITH CONTOURED BEARING SURFACES TO REDUCE SHEAR IN CONNECTORS

(71) Applicant: AMERIFORGE GROUP INC., Houston, TX (US)

(72) Inventor: Justin Fraczek, Houston, TX (US)

(73) Assignee: AMERIFORGE GROUP INC., Houston, TX (US)

( * ) Notice: Subject to any disclaimer, the term of this patent is extended or adjusted under 35 U.S.C. 154(b) by 340 days.

(21) Appl. No.: 15/128,770

(22) PCT Filed: Mar. 24, 2015

(86) PCT No.: PCT/US2015/022278
§ 371 (c)(1),
(2) Date: Sep. 23, 2016

(87) PCT Pub. No.: WO2015/148528
PCT Pub. Date: Oct. 1, 2015

(65) Prior Publication Data
US 2017/0175937 A1    Jun. 22, 2017

Related U.S. Application Data

(60) Provisional application No. 61/969,579, filed on Mar. 24, 2014.

(51) Int. Cl.
*E21B 17/04* (2006.01)
*F16L 23/036* (2006.01)
*F16L 23/00* (2006.01)

(52) U.S. Cl.
CPC ............ *F16L 23/036* (2013.01); *E21B 17/04* (2013.01)

(58) Field of Classification Search
CPC ....... F16L 23/032; F16L 23/036; E21B 17/04; E21B 17/085; Y10T 403/645; F16B 7/182; F16D 1/033; F16D 1/076
(Continued)

(56) References Cited

U.S. PATENT DOCUMENTS 275,098 A * 4/1883 Walker .................... F16L 27/04
285/146.3
815,581 A * 3/1906 Dean .................. F16L 27/0849
285/18
(Continued)

FOREIGN PATENT DOCUMENTS

GB       2200179        7/1988
WO    WO-2014150816 A1 *  9/2014 ........... E21B 17/085

OTHER PUBLICATIONS

International Search Report and Written Opinion issued in Application No. PCT/US2015/022278, dated Jun. 26, 2015.

*Primary Examiner* — David Bochna
*Assistant Examiner* — Stacy N Lawson
(74) *Attorney, Agent, or Firm* — Norton Rose Fulbright US LLP (57) ABSTRACT

This disclosure includes riser flange assemblies and related methods. Some assemblies include first and second flanges each defining a plurality of counterbored bolt holes and having a plurality of concave bearing surfaces each disposed around one of the counterbored bolt holes, a plurality of bolts each having a head and a male threaded portion, a plurality of washers each having a convex bearing surface configured to correspond to the concave bearing surface of a bolt hole when one of the bolts extends through the washer and the bolt hole and a plurality of nuts each having a convex bearing surface and a female threaded portion configured to receive the male threaded portion of one of the bolts, the convex bearing surface configured to correspond to the (Continued)

concave bearing surface of a bolt hole when one of the bolts extends through the bolt hole and is received in the nut.

18 Claims, 4 Drawing Sheets

(58) Field of Classification Search
USPC .................. 285/368, 412; 403/337; 166/367
See application file for complete search history.

(56) References Cited

U.S. PATENT DOCUMENTS

| | | | | |
|---|---|---|---|---|
| 960,899 A | 6/1910 | Guyer | ........................... | 285/181 |
| 1,363,504 A | 12/1920 | Flynn | ........................... | 411/140 |
| 1,635,895 A * | 7/1927 | Michelin | ................ | B60B 11/06 |
| | | | | 301/35.628 |
| 2,138,698 A * | 11/1938 | Heaston | .................... | F16C 3/28 |
| | | | | 411/116 |
| 2,308,745 A | 1/1943 | English | ........................... | 285/94 |
| 2,385,159 A * | 9/1945 | Peters | .................... | F16B 39/38 |
| | | | | 411/226 |
| 2,564,550 A * | 8/1951 | Tichenor | ................. | F16B 39/06 |
| | | | | 411/321 |
| 4,058,023 A | 11/1977 | Smith | ........................... | 474/162 |
| 4,133,558 A | 1/1979 | Ahlstone | ........................ | 285/39 |
| 4,225,264 A | 9/1980 | Coone | ........................... | 403/337 |
| 4,640,537 A | 2/1987 | Chaix et al. | .................. | 285/368 |
| 4,819,007 A * | 4/1989 | Tezcan | ................... | H01Q 1/125 |
| | | | | 343/765 |
| 4,830,557 A | 5/1989 | Harris et al. | ................... | 411/113 |
| 4,840,409 A * | 6/1989 | Welkey | ................. | F16L 27/053 |
| | | | | 277/625 |
| 6,039,497 A * | 3/2000 | Gullberg | ................... | F16B 3/06 |
| | | | | 403/15 |
| 6,176,663 B1 | 1/2001 | Nguyen et al. | ............... | 411/368 |
| 6,722,707 B1 * | 4/2004 | Schurmann | ........... | F16L 23/032 |
| | | | | 285/412 |
| 6,918,619 B2 | 7/2005 | Thompson | ..................... | 285/412 |
| 7,056,053 B2 | 6/2006 | Schilling et al. | .............. | 403/337 |
| 7,118,139 B2 | 10/2006 | Katorgin et al. | ............. | 285/368 |
| 2011/0131898 A1 | 6/2011 | Nies et al. | ................... | 52/173.1 |
| 2016/0032662 A1* | 2/2016 | Walker | ................. | E21B 17/085 |
| | | | | 166/367 |

* cited by examiner

FIG. 5A ic # DRILLING RISER FLANGES AND ASSEMBLIES WITH CONTOURED BEARING SURFACES TO REDUCE SHEAR IN CONNECTORS

This application is a national phase application under 35 U.S.C. § 371 of International Application No. PCT/US2015/022278, filed Mar. 24, 2015, which claims the benefit of priority to U.S. Provisional Patent Application Ser. No. 61/969,579, filed Mar. 24, 2014, each of which are hereby incorporated by reference in their entirety.

BACKGROUND

1. Field of Invention

The present invention relates generally to drilling risers, and more specifically, but not by way of limitation, to drilling riser flange assemblies.

2. Description of Related Art

Examples of flange assemblies are disclosed in U.S. Pat. No. 7,056,053 and U.S. patent application Ser. No. 12/770,659.

Flanged connections have a wide variety of industrial uses and generally operate to connect one member to another to allow the members to bear loads and/or transport materials (which may be under high-pressure). One such use is in sub-sea drilling operations, where flanges may be used to connect riser sections. Generally, risers are conduits that transport materials (e.g., injection fluids, drilling mud, and/or or produced hydrocarbons, such as oil, and/or the like) from the sea floor to an above-sea facility. Flanges used in these applications typically require consistent face-to-face contact to prevent leaks and otherwise permit proper operation. Face-to-face contact between the flanges is commonly ensured by a plurality of fasteners (e.g., nuts and bolts) that are tightened to a high percentage of their yield strength. However, the tightening of the flanges often results in both flanges displacing or deflecting in an axial direction (e.g., compression) as well as a radial direction (e.g., stretching) and more so if the flanges are not perfectly matched due to manufacturing variances and/or the like. Such radial displacements and/or deflections can transfer significant bending moments and sheer forces to the fasteners holding the flanges together, which in some cases can result in bolt breakage and flange failure. Therefore, these forces must be accounted for in the tightening procedure. For example, such forces contribute to the total stress on the fasteners without supplying additional face-to-face clamping force, thus reducing the amount of fastener tightening allowable and therefore the maximum allowable clamping force between the flanges.

Tightening is not the only instance where flange displacements and/or deflections can transmit undesirable bending moments and sheer forces to the fasteners. During operation, risers may undergo motion (e.g., due to ocean currents, vibrations, and/or the like). Such motion can result in one flange of a flanged connection displacing and/or deflecting relative to the other. These displacements and/or deflections can transfer significant undesirable bending moments and sheer forces to the fasteners, which may result in fastener breakage and flange failure.

SUMMARY

Embodiments of the present riser flange assemblies can be configured, through a plurality of pivotable members, to be secured together and/or for one flange to displace and/or deflect relative to the other flange substantially without transferring shear forces or bending moments to the fasteners (e.g., substantially keeping the fasteners only in tension).

Embodiments of the present riser flange assemblies can be configured, through a plurality of pivotable members disposed within counterbored bolt holes, such that the flanges can be in a pin-up or a box-up configuration.

Some embodiments of the present riser flange assemblies comprise: first and second flanges each defining a plurality of counterbored bolt holes and having a plurality of concave bearing surfaces each disposed around one of the counterbored bolt holes; a plurality of bolts each having a head and a male threaded portion; a plurality of washers each having a convex bearing surface configured to correspond to the concave bearing surface of a counterbored bolt hole when one of the bolts extends through the washer and the counterbored bolt hole; and a plurality of nuts each having convex bearing surface and a female threaded portion configured to receive the male threaded portion of one of the bolts, the convex bearing surface configured to correspond to the concave bearing surface of a counterbored bolt hole when one of the bolts extends through the counterbored bolt hole and is received in the nut. In some embodiments, the plurality of washers each comprise a planar mating surface configured to correspond to a planar mating surface of each bolt. In some embodiments, the concave bearing surfaces are spherical. In some embodiments, the convex bearing surfaces are spherical. In some embodiments, the first and second flanges each comprise an elliptically tapered neck portion.

In some embodiments of the present riser flange assemblies, the flanges each comprise: a raised inner face; and an offset outer face adjacent to the raised inner face and defining an edge between the raised inner face and the offset outer face. In some embodiments, the counterbored bolt holes are substantially centered on the edge. In some embodiments, the first and second flanges comprise a plurality of through holes each configured to receive at least one of a kill line, choke line, or a booster line. In some embodiments, the counterbored bolt holes comprise a cylindrical wall. In some embodiments, the bolts comprise a smooth shank disposed between the head and the male threaded portion. In some embodiments, at least one of the first and second flanges comprises a plurality of recesses each bordering one of the counterbored bolt holes; and the nuts each comprises a recess configured to align with the recess bordering a counterbored bolt hole within which the nut is disposed to removably receive a dowel that substantially restrains the nut from rotating relative to the flange during tightening of the bolts. In some embodiments, the washers each comprise a chamfered edge opposite the convex bearing surface. In some embodiments, the plurality of counterbored bolt holes comprises six counterbored bolt holes. In some embodiments, the plurality of bolts comprises six bolts. In some embodiments, the plurality of washers comprises six washers. In some embodiments, the plurality of nuts comprises six nuts. In some embodiments, the plurality of through holes comprises six through holes.

Some embodiments of the present riser flange assemblies comprise: first and second flanges defining a plurality of counterbored bolt holes; a plurality of first pivotable members each disposed in one of the counterbored bolt holes of the first flange; a plurality of second pivotable members each disposed in one of the counterbored bolt holes of the second flange; and a plurality of bolts each disposed through a first pivotable member and a second pivotable member such that the bolts secure the first flange relative to the second flange substantially without transferring shear forces or bending moments to the bolts. In some embodiments, each of the first and second pivotable members comprises a convex bearing surface at least a portion of which is configured to correspond to a concave bearing surface of the counterbored bolt hole within which the first or second pivotable member is disposed. In some embodiments, the counterbored bolt holes are configured such that the bolts do not directly contact the first flange or the second flange. In some embodiments, the counterbored bolt holes are each configured such that sides of the pivotable members do not directly contact the portions of the flange that define sides of the counterbored bolt hole. In some embodiments, the first pivotable members each comprise a planar mating surface and the bolts each comprise a planar mating surface in contact with the planar mating surface of the first pivotable member through which the bolt is disposed.

Some embodiments of the present methods (e.g., of assembling a riser flange) comprise: disposing a washer into a counterbored bolt hole of a first flange such that at least a portion of a convex bearing surface of the washer that corresponds to a concave bearing surface of the counterbored bolt hole contacts the concave bearing surface; inserting a bolt through the washer; disposing a nut into a counterbored bolt hole of a second flange such that at least a portion of a convex bearing surface of the nut that corresponds to a concave bearing surface of the counterbored bolt hole contacts the concave bearing surface; threading a male threaded portion of the bolt into a female threaded portion of the nut such that the bolt couples the first flange to the second flange. In some embodiments, the bolt is inserted through the washer and threaded into the nut such that a planar mating surface of the bolt contacts a planar mating surface of the washer. Some embodiments further comprise: inserting a dowel between the first flange and the nut such that the dowel extends into a recess of the second flange bordering the counterbored bolt hole and into a recess of the nut to substantially prevent rotation of the nut relative to the second flange.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, 10, and 20 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DETAILED DESCRIPTION OF ILLUSTRATIVE EMBODIMENTS

Figure 1:
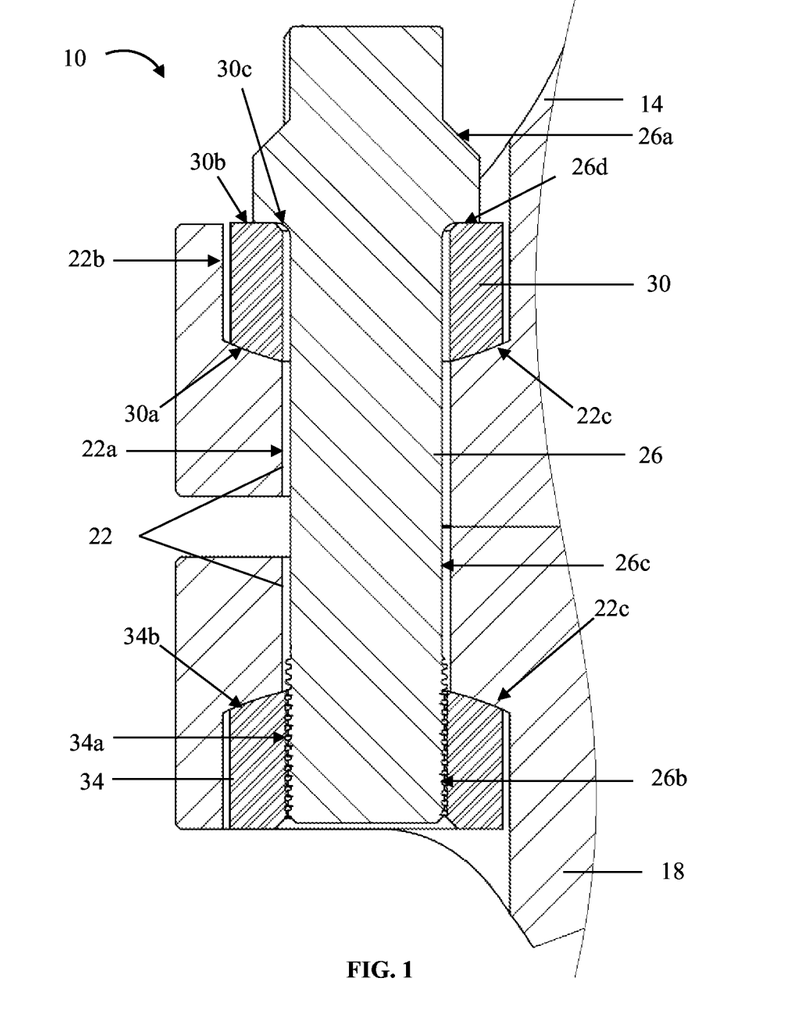
FIG. 1 depicts a cutaway and cross-sectional side view of a first embodiment of the present riser flange assemblies.

Referring now to the drawings, and more particularly to FIG. 1, shown therein and designated by the reference numeral 10 is a first embodiment of the present riser flange assemblies. Flange assembly 10 comprises first and second flanges 14 and 18 (e.g., first flange 14 and second flange 18). In the embodiment shown, each of flanges 14 and 18 define a plurality of counterbored bolt holes 22. In this embodiment, bolt holes 22 are counterbored in that they comprise a through hole portion 22a (e.g., that completely cuts through the flange) and an enlarged (e.g., relative to portion 22a) counterbored portion 22b (e.g., that does not completely cut through the flange, in what may be referred to in the art as a blind portion). In flange assembly 10, counterbored portions 22b comprise a cylindrical wall (e.g., counterbored portions 22b are cylindrical counterbores and define a substantially circular cross-section). In the embodiment shown, each of the plurality of bolt holes 22 further comprises a concave bearing surface 22c. Concave bearing surfaces 22c of flange assembly 10 are located at the bottom of counterbored portions 22b of bolt holes 22 and each is disposed around one of the counterbored bolt holes (e.g., defining the boundary between through hole portions 22a and counterbored portions 22b, as shown).

In the embodiment shown, flange assembly 10 further comprises a plurality of bolts 26 configured to be received by counterbored bolt holes 22 (e.g., as shown). In this embodiment, bolts 26 comprise a head 26a, a male threaded portion 26b, and a shank 26c. Shank 26c can be configured such that if flange 14 and/or 18 is displaced and/or deflects relative to bolts 26 when flange assembly 10 is assembled and/or in use, the bolts do not bind (e.g., become caught on an edge of flange 14 and/or 18) with either flange (e.g., shank 26c in flange assembly 10 is substantially smooth having no threads or edges). In the embodiment shown, flange assembly 10 further comprises a plurality of washers 30 each having a convex bearing surface 30a configured to correspond to the concave bearing surface 22c of a counterbored bolt hole 22 (e.g., at least a portion of convex bearing surface 30a is configured to interface or be in contact with concave bearing surface 22c when flange assembly 10 is assembled and/or in use, for example, when one of the bolts extends through the washer and the counterbored bolt hole, as shown). In this way, washers 30 are configured to pivot within counterbored portions 22b of bolt holes 22 while maintaining contact with concave bearing surfaces 22c (e.g., washers 30 comprise pivotable members) (described in more detail below). In the embodiment shown, concave bearing surfaces 22c and convex bearing surfaces (e.g., 30a and 34b, described below) are spherical (have a profile corresponding to a portion of sphere), however, in other embodiments, the concave and/or convex bearing surfaces can comprise any shape and/or structure which permits the functionality described in this disclosure, including, but not limited to elliptical, otherwise concave (e.g., having a surface that curves inward), and/or otherwise convex (e.g., having a surface that curves outward).

In the embodiment shown, washers 30 further comprise a planar (e.g., substantially flat) mating surface 30b configured to correspond to a planar mating surface 26d of a bolt 26 (e.g., such that planar mating surface 26d of bolt 26 rests substantially against planar mating surface 30b of washer 30 when the flange assembly is assembled and/or in use, as shown). In this way, bolt 26 may be secured flatly against washer 30 (e.g., by tightening nut 34) regardless of the orientation of components (e.g., bolt 26, washer 30, nut 34, and/or the like) within the flange assembly (e.g., assembly 10 is configured such that bolt 26 can pivot with washer 30 without substantially compromising the interface between the bolt and the washer and/or subjecting the bolt or washer to undesired sheer forces or bending moments). Washers 30 of flange assembly 10 further comprise a chamfered edge 30c opposite convex bearing surface 30a (e.g., to facilitate reception of bolt 26 within washer 30). In the embodiment shown, flange assembly 10 further comprises a plurality of nuts 34 each having a female threaded portion 34a configured to receive male threaded portion 26b of one of the bolts 26 (e.g., female threaded portion 34a has threads with the same or similar pitch, pitch diameter, and/or the like as male threaded portion 26b such that nut 34 can be threaded and/or secured onto bolt 26, as shown). In other embodiments, the nuts can be configured to be secured to the bolts through any different and/or additional structure which permits the functionality described in this disclosure, including, but not limited to, multi-jackbolts, lock nuts, and/or the like. In the embodiment shown, nuts 34 comprise a convex bearing surface 34b configured to correspond to the concave bearing surface 22c of a counterbored bolt hole 22 (e.g., similar to as described above for convex bearing surface 30a of washer 30, for example, when one of the bolts extends through the counterbored bolt hole and is received in the nut, as shown). In this way, bolt 26 can be permitted some degree of displacement and/or deflection within bolt holes 22 relative to flanges 14 and/or 18 through pivotal operation of convex bearing surfaces 30a and/or 34b interfaced or in contact with concave bearing surfaces 22c (described in more detail below) (e.g., thus minimizing sheer forces or bending moments applied to bolt 26, washer 30, and nut 34 when flange assembly 10 is assembled and/or in use).

While FIG. 1 depicts flange assembly 10 in a box-up configuration (e.g., threaded portions 26b of bolts 26 protrude downwardly from flange 14 and are received within counterbored bolt holes 22 of flange 18), flange assembly 10 can also be configured in a pin-up configuration, or a mixture of the two configurations. For example, each counterbored bolt hole 22 is configured to receive either a washer 30 or a nut 34 (e.g., and each can thus be in either box-up or pin-up configuration) and concave bearing surfaces 30a and 34b are the same or substantially similar (e.g., to permit pivoting operation regardless of whether a nut or washer is received within the counterbored bolt hole). In this way, any given set of counterbored bolt holes 22 (e.g., a bolt hole 22 of both flange 14 and flange 18) can be configured in pin-up or box-up configuration.

Figure 2:
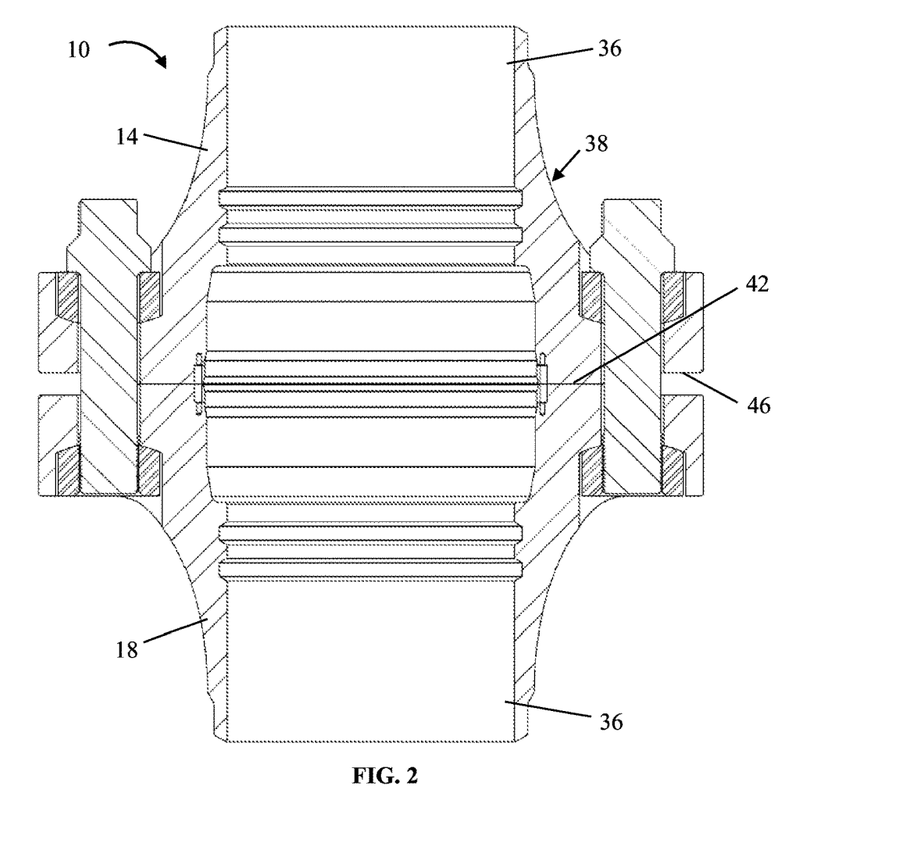
FIG. 2 depicts a cross-sectional side view of the first embodiment.

Referring now to FIG. 2, shown is a cross-sectional side view of flange assembly 10. In the embodiment shown, flanges 14 and 18 each comprise a hollow central lumen 36, configured to be coupled to and/or in fluid communication with a main riser pipe (not shown) (e.g., such that fluid can flow through flange assembly 10 when in use). In the embodiment shown, flanges 14 and 18 comprise an elliptically tapered neck portion 38 configured to relieve stress concentrations within the flanges (e.g., such that loads are evenly distributed throughout the flange bodies). In the embodiment shown, flanges 14 and 18 further comprise a raised inner face 42 and an offset outer face 46 adjacent to the raised inner face and defining an edge 50 (shown on FIG. 3) between the raised inner face and the offset outer face. Such features can facilitate locating of the flanges relative to one another during assembly, as well as mitigate shear or bending loads applied to the fasteners (e.g., bolts 26, washers 30, and/or nuts 34) when flange 10 is assembled and/or in use.

Figure 3:
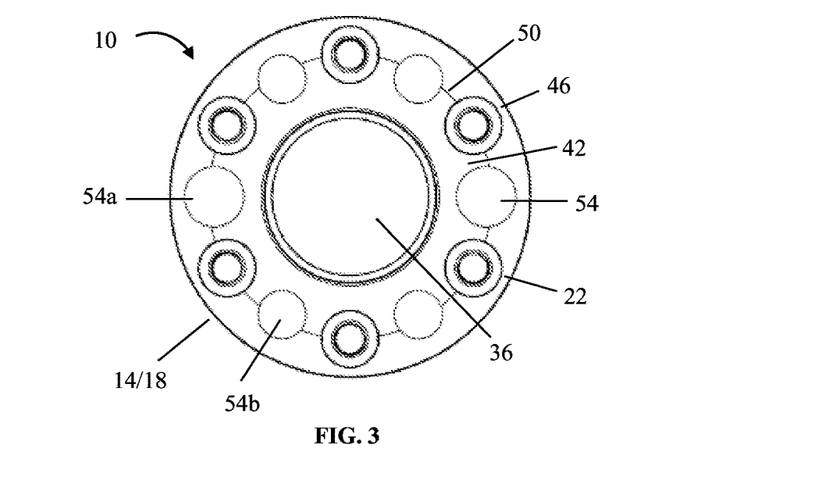
FIG. 3 depicts a bottom view of the first embodiment.

Referring now to FIG. 3, shown is a bottom view of flange assembly 10. In the embodiment shown, flanges 14 and 18 comprise a plurality of through holes 54 each configured to receive at least one of a kill line, choke line, or a booster line. For example, each through hole 54 is sized to receive a corresponding line (e.g., through hole 54a has a larger transverse dimension than through hole 54b and is thus configured to receive a larger corresponding line). In the embodiment shown, flange assembly 10 comprises six through holes 54, however, in other embodiments, the flange assemblies can comprise any number of through holes which permits the functionality described in this disclosure (e.g., 0, 1, 2, 3, 4, 5, 6, 7, 8, 9, 10, or more through holes) (e.g., and the number and/or placement of through holes can be selected based on kill, choke, booster, and/or the like line requirements). In the embodiment shown, counterbored bolt holes 22 and through holes 54 are substantially centered on the edge (e.g., as shown) (e.g., to further mitigate undesirable sheer forces and/or bending moments applied to the fasteners). In the embodiment shown, flange assembly 10 comprises six counterbored bolt holes 22, six bolts 26, six washers 30, and six nuts 34 (e.g., an equal number of bolt holes, bolts, washers, and nuts). However, in other embodiments, the present flange assemblies can comprise any number of bolt holes, bolts, washers and/or nuts, which permits the functionality described in this disclosure, including an unequal number of such components (e.g., spare, optional, replacement, and/or the like components) (e.g., 1, 2, 3, 4, 5, 6, 7, 8, 9, 10, or more bolt holes, bolts, washers and/or nuts).

Figure 4:
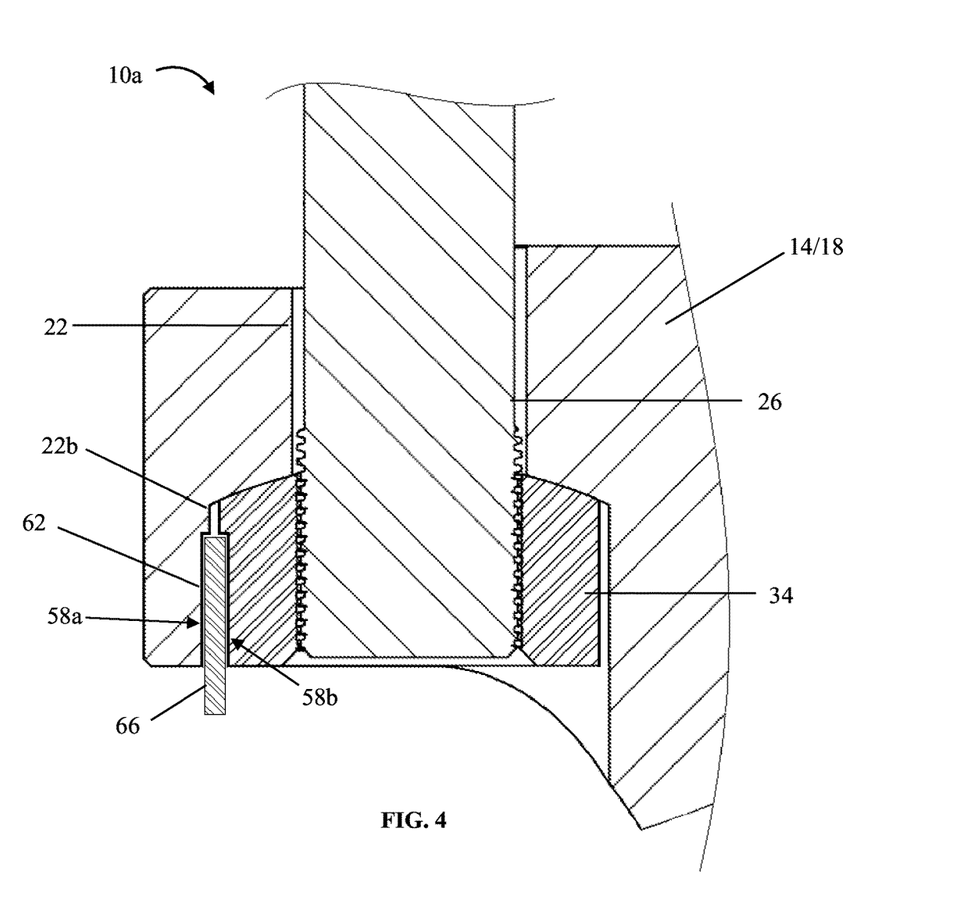
FIG. 4 depicts a cutaway and cross-sectional side view of a second embodiment of the present riser flange assemblies comprising a dowel and locating hole.

Referring now to FIG. 4, shown is a cutaway and cross-sectional side view of a second embodiment 10a of the present riser flange assemblies. Flange assembly 10a is substantially similar to flange assembly 10 with the primary exception described below. In some embodiments, at least one of the first and second flanges (e.g., both of flanges 14 and 18, in the embodiment shown) further comprises a plurality of recesses 58a, each recess bordering one of the counterbored bolt holes (e.g., in a wall defining counterbored portion 22b of the respective counterbored bolt hole (22)). In the embodiment shown, each of the nuts 34 comprises a recess 58b configured to align with a corresponding recess 58a that borders the counterbored bolt hole within which the nut is disposed (e.g., the recesses are configured to align (e.g., be adjacent) with one another) In the embodiment shown, the recesses are configured to, when aligned with one another, removably receive a dowel 66 configured to substantially restrain nut 34 from rotating relative to the flange during tightening of the bolts. For example, nut 34 can be threaded onto bolt 26, the nut can be received by counterbored bolt hole 22, recesses 58a and 58b can be aligned (e.g., by rotating the nut and/or bolt relative to flange 14 or 18) to receive dowel 66, bolt 26 can be tightened to a desired specification, and dowel 66 can, in some instances, be removed to permit pivotal operation of nut 34 (in other instances, dowel 66 can be sized to prevent rotation of the nut around the bolt while permitting some rotation of the nut relative to the concave bearing surface of the flange).

Figure 5A:
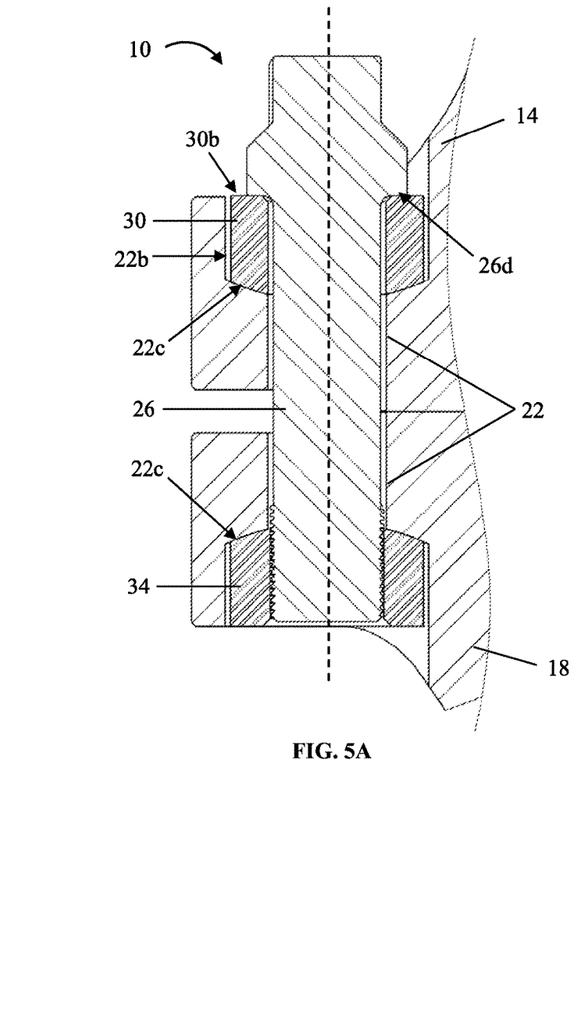
FIGS. 5A and 5B depict cutaway cross-sectional side views of the first embodiment in both an undisplaced and a displaced operating condition, respectively.
Figure 5B:
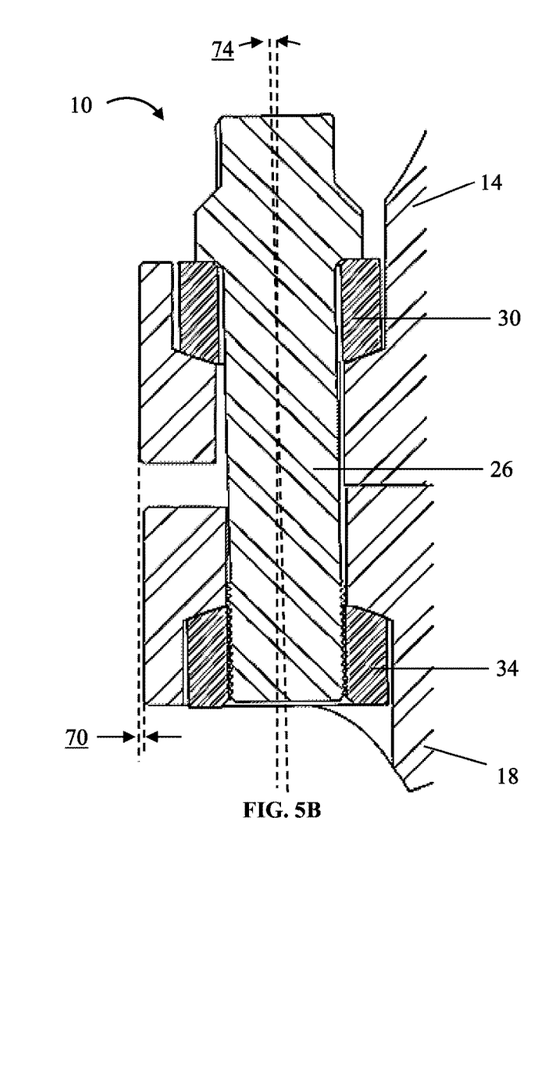

Referring now to FIGS. 5A and 5B, shown is a cutaway cross-sectional side view of flange assembly 10 in both an undisplaced and a displaced operating condition, respectively. The displaced operating condition shown in FIG. 5B can be as result of flange mismatch (e.g., due to manufacturing variances), tightening of the flanges relative to one another (e.g., resulting in axial and radial deflections of the flanges), vibrations and/or other forces (e.g., causing one flange to slip relative to the other), and/or the like. The displaced operating condition shown in FIG. 5B is used only by way of example and may be an exaggerated but illustrative depiction for some embodiments of the present flange assemblies (e.g., which may not be configured to allow and/or experience displacement and/or deflection of the shown magnitude). In other words, the operating conditions in FIG. 5A, and more particularly FIG. 5B, may not be drawn to scale for some embodiments of the present flange assemblies. In the embodiment shown, flange assembly 10 comprises a plurality of bolts 26 each disposed through both a first pivotable member (e.g., washer 30 of flange 14) and a second pivotable member (e.g., nut 34 of flange 18), however, in other embodiments, the first and second pivotable members can comprise any structures and/or components that permit the functionality described in this disclosure (e.g., such that the first and second pivotable members are capable of securing flange 14 to flange 18 and are capable of pivotal displacement).

As illustrated, in the embodiment shown, flange assembly 10 is configured to permit a limited amount of displacement and/or deflection of flange 14 relative to flange 18 (e.g., displacement and/or deflection 70, which may be caused by riser movement due to ocean currents and/or the like, vibration, flange tightening, misaligned flanges, and/or the like) without substantially transferring shear forces or bending moments to the bolts or fasteners (e.g., pivotable members 30 and 34 can pivot on concave bearing surfaces 22c to allow bolt 26 to displace, for example, to displaced position 74, thus reducing and/or eliminating shear forces and/or bending moments applied to the bolts and/or fasteners). For example, when bolt 26 is in the operating condition shown in FIG. 5B, the bolt remains substantially only in tension, despite displacement and/or deflection of flange 14 relative to flange 18. Additionally, flange assembly 10 can be configured to align otherwise misaligned flanges. For example, if flange 14 is misaligned with flange 18 (e.g., due to manufacturing variances) as shown in FIG. 5B, bolts 26 can be tightened to force (e.g., displace and/or deflect) the flanges into alignment, as shown in FIG. 5A, while the pivotable members substantially prevent the transfer of shear forces and/or bending moments to the bolts and/or fasteners. FIG. 5B depicts merely exemplary displacements and/or deflections that may be experienced by flange assembly 10, but does not limit flange assembly 10 to the shown displacements or deflections. For example, and in the embodiment shown, due to the substantial rotational symmetry of bolts 26, bolt holes 22, and first and second pivotable members (e.g., washers 30 and nuts 34), planar (e.g., defined substantially by the interface between flange 14 and flange 18) displacements and/or deflections of flange 14 relative to flange 18 in any direction can occur, which can result in bolt 26 displacements substantially similar to displaced position 74 (e.g., but potentially in a different direction), without subjecting the bolts and/or fasteners to undesirable shear forces and/or bending moments.

Mitigation of sheer and bending loads can be further facilitated through configuration of counterbored bolt holes 22. For example, in the embodiment shown, counterbored bolt holes 22 are configured such that the bolts 26 do not directly contact flanges 14 or 18 (e.g., configured through counterbored bolt holes 22 having a larger transverse dimension than that of bolts 26, as shown). Such configuration allows for displacement of the bolt and pivotable members within the flanges without transferring bending and/or sheer forces to the bolts or fasteners (e.g., as shown in FIG. 5B). Additionally, in the embodiment shown, counterbored bolt holes 22 are configured such that the sides of the first and/or second pivotable members (e.g., washers 30 and/or nuts 34) do not directly contact the portions of the flange that define the sides of counterbored bolt holes 22 (e.g., through pivotable members having a smaller transverse dimension than that of counterbored portions 22b of bolt holes 22). Relative sizes of counterbored bolt holes 22, bolts 26, and pivotable members (e.g., washers 30 and nuts 34) can be selected based on an expected and/or acceptable maximum relative flange displacements and/or deflections (e.g., to limit and/or allow bolt, pivotable members, and/or flange: misalignment, displacement, and/or deflection). In substantially similar fashion, and as shown, washers 30 can be configured to allow such displacements and/or deflections (e.g., by having a larger inner diameter than the transverse dimension of bolt 26). In the embodiment shown, the first pivotable members (e.g., washers 30) each comprise a planar mating surface 30b and the bolts each comprise a planar mating surface 26d in contact with (e.g., in some cases, resting substantially flatly against) the planar mating surface of the first pivotable member through which the bolt is disposed. In this way, bolt 26 remains in secure engagement with the first pivotable members (e.g., washer 30), regardless of the orientation of the bolt or first and second pivotable members within the flanges (e.g., as shown in FIG. 5B).

Some of the present methods comprise disposing a washer into a counterbored bolt hole (e.g., 22) of a first flange (e.g., 14) such that at least a portion of a convex bearing surface of the washer (e.g., 30a) that corresponds to a concave bearing surface of the counterbored bolt hole (e.g., 22c) contacts the concave bearing surface, inserting a bolt (e.g., 26) through the washer, disposing a nut (e.g., 34) into a counterbored bolt hole (e.g., 22) of a second flange (e.g., 18) such that at least a portion of a convex bearing surface of the nut (e.g., 34b) that corresponds to a concave bearing surface of the counterbored bolt hole (e.g., 22c) contacts the concave bearing surface, and threading a male threaded portion of the bolt (e.g., 26b) into a female threaded portion of the nut (e.g., 34a) such that the bolt couples the first flange to the second flange. In some of the present methods, the bolt (e.g., 26) is inserted through the washer (e.g., 30) and threaded into the nut (e.g., 34) such that a planar mating surface of the bolt (e.g., 26d) contacts a planar mating surface of the washer (e.g., 30b). Some embodiments of the present methods comprise inserting a dowel (e.g., 66) between the first flange (e.g., 14) and the nut (e.g., 34) such that the dowel extends into a recess of the second flange bordering the counterbored bolt hole (e.g., 58a) and into a recess of the nut (e.g., 58b) to substantially prevent rotation of the nut relative to the second flange.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A riser flange assembly comprising:
   first and second flanges each defining a plurality of counterbored bolt holes and having a plurality of concave bearing surfaces each disposed around one of the counterbored bolt holes;
   a plurality of bolts each having a head and a male threaded portion;
   a plurality of washers each having a convex bearing surface configured to correspond to the concave bearing surface of one of the counterbored bolt holes when one of the bolts extends through the washer and the counterbored bolt hole; and
   a plurality of nuts each having a convex bearing surface and a female threaded portion configured to receive the male threaded portion of one of the bolts, the convex bearing surface configured to correspond to the concave bearing surface of one of the counterbored bolt holes when one of the bolts extends through the counterbored bolt hole and is received in the nut;
   where at least one of the first and second flanges defines a plurality of recesses each bordering one of the counterbored bolt holes; and
   where each of the nuts defines a recess configured to align with the recess bordering the counterbored bolt hole within which the nut is disposed to removably receive a dowel that substantially restrains the nut from rotating relative to the flange during tightening of the bolts.

2. The riser flange assembly of claim 1, where the plurality of washers each comprise a planar mating surface configured to correspond to a planar mating surface of each bolt.

3. The riser flange assembly of claim 1, where the convex bearing surfaces are spherical.

4. The riser flange assembly of claim 1, where the concave bearing surfaces are spherical.

5. The riser flange assembly of claim 1, where the first and second flanges each comprise an elliptically tapered neck portion.

6. The riser flange assembly of claim 1, where the flanges each comprise:
   a raised inner face; and
   an offset outer face adjacent to the raised inner face and defining an edge between the raised inner face and the offset outer face.

7. The riser flange assembly of claim 6, where the counterbored bolt holes are substantially centered on the edge.

8. The riser flange assembly of claim 1, where the first and second flanges comprise a plurality of through holes each configured to receive at least one of a kill line, choke line, or a booster line.

9. The riser flange assembly of claim 8, where the plurality of through holes comprises six through holes.

10. The riser flange assembly of claim 1, where the counterbored bolt holes comprise a cylindrical wall.

11. The riser flange assembly of claim 1, where the bolts comprise a smooth shank disposed between the head and the male threaded portion.

12. The riser flange assembly of claim 1, where the washers each comprise a chamfered edge opposite the convex bearing surface.

13. The riser flange assembly of claim 1, where the plurality of counterbored bolt holes comprises six counterbored bolt holes.

14. The riser flange assembly of claim 1, where the plurality of bolts comprises six bolts.

15. The riser flange assembly of claim 1, where the plurality of washers comprises six washers.

16. The riser flange assembly of claim 1, where the plurality of nuts comprises six nuts.

17. A method of assembling a riser flange comprising:
   disposing a washer into a counterbored bolt hole of a first flange such that at least a portion of a convex bearing surface of the washer that corresponds to a concave bearing surface of the counterbored bolt hole contacts the concave bearing surface;
   inserting a bolt through the washer;

disposing a nut into a counterbored bolt hole of a second flange such that at least a portion of a convex bearing surface of the nut that corresponds to a concave bearing surface of the counterbored bolt hole contacts the concave bearing surface;

inserting a dowel between the second flange and the nut such that the dowel extends into a recess of the second flange bordering the counterbored bolt hole and into a recess of the nut to substantially prevent rotation of the nut relative to the second flange; and threading a male threaded portion of the bolt into a female threaded portion of the nut such that the bolt couples the first flange to the second flange.

18. The method of claim 17, where the bolt is inserted through the washer and threaded into the nut such that a planar mating surface of the bolt contacts a planar mating surface of the washer.

\* \* \* \* \*